(12) United States Patent
Thomas et al.

(10) Patent No.: US 12,120,022 B1
(45) Date of Patent: Oct. 15, 2024

(54) TRAFFIC FILTERING BASED ON DESTINATION ADDRESS AND INCOMING INTERFACE OF A NETWORK DEVICE

(71) Applicant: Juniper Networks, Inc., Sunnyvale, CA (US)

(72) Inventors: Shijo Thomas, Sunnyvale, CA (US); Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 25 days.

(21) Appl. No.: 17/932,532

(22) Filed: Sep. 15, 2022

(51) Int. Cl.
*H04L 45/00* (2022.01)
*H04L 45/42* (2022.01)
*H04L 45/745* (2022.01)

(52) U.S. Cl.
CPC ............ *H04L 45/566* (2013.01); *H04L 45/42* (2013.01); *H04L 45/745* (2013.01)

(58) Field of Classification Search
CPC ...... H04L 45/566; H04L 45/42; H04L 45/745
See application file for complete search history.

(56) References Cited

U.S. PATENT DOCUMENTS

| | | | | |
|---|---|---|---|---|
| 8,893,267 B1 * | 11/2014 | Sathe | ............... | G06F 21/554 711/163 |
| 10,972,407 B1 * | 4/2021 | Kurtsov | ............... | G06F 21/53 |
| 2003/0223402 A1 * | 12/2003 | Sanchez | ............... | H04L 12/2854 370/351 |
| 2006/0258369 A1 * | 11/2006 | Burroughs | ............ | G01S 5/0205 455/12.1 |
| 2012/0281539 A1 * | 11/2012 | Patel | ............... | H04L 45/04 370/241 |
| 2015/0131660 A1 * | 5/2015 | Shepherd | ............... | H04L 45/74 370/390 |
| 2016/0248658 A1 * | 8/2016 | Patel | ............... | H04L 45/48 |
| 2021/0099416 A1 * | 4/2021 | Yoshikawa | ............ | H04L 51/224 |
| 2022/0166717 A1 * | 5/2022 | Pfosi | ............... | H04L 45/24 |
| 2022/0286855 A1 * | 9/2022 | Li | ............... | H04W 12/72 |
| 2023/0132302 A1 * | 4/2023 | Hu | ............... | G06F 13/28 709/212 |

* cited by examiner

*Primary Examiner* — Michael A Keller
(74) *Attorney, Agent, or Firm* — Harrity & Harrity, LLP

(57) ABSTRACT

In some implementations, a network device may receive one or more packets via an incoming interface of the network device. The network device may forward, or refraining from forwarding, based on a destination address associated with the one or more packets and the incoming interface of the network device, the one or more packets. The network device may receive, prior to receiving the one or more packets, route information indicating the destination address, and at least one of a set of one or more authorized incoming interfaces of the network device or a set of one or more authorized identifiers that are associated with the destination address and may save the route information in an entry of a data structure. Forwarding, or refraining from forwarding, the one or more packets may further be based on the entry of the data structure.

20 Claims, 8 Drawing Sheets

TRAFFIC FILTERING BASED ON DESTINATION ADDRESS AND INCOMING INTERFACE OF A NETWORK DEVICE

BACKGROUND

A server device can provide services (e.g., cloud services) to customer devices (e.g., that subscribe to the services) via a network device (e.g., a router device). Each service may be associated with a particular destination address, such as a particular Internet protocol (IP) address, of the server device.

SUMMARY

In some implementations, a network device includes one or more memories; and one or more processors to: receive one or more packets via an incoming interface of the network device; determine a destination address associated with the one or more packets; identify the incoming interface of the network device; determine, based on the destination address and the incoming interface of the network device, whether the network device is to forward the one or more packets; and forward, or refrain from forwarding, based on determining whether the network device is to forward the one or more packets, the one or more packets.

In some implementations, a non-transitory computer-readable medium storing a set of instructions includes one or more instructions that, when executed by one or more processors of a network device, cause the network device to: receive one or more packets via an incoming interface of the network device; determine, based on a destination address associated with the one or more packets and the incoming interface of the network device, whether the network device is to forward the one or more packets; and forward, or refrain from forwarding, based on determining whether the network device is to forward the one or more packets, the one or more packets.

In some implementations, a method includes receiving, by a network device, one or more packets via an incoming interface of the network device; and forwarding, or refraining from forwarding, by the network device and based on a destination address associated with the one or more packets and the incoming interface of the network device, the one or more packets.

DETAILED DESCRIPTION

Figure 1A:
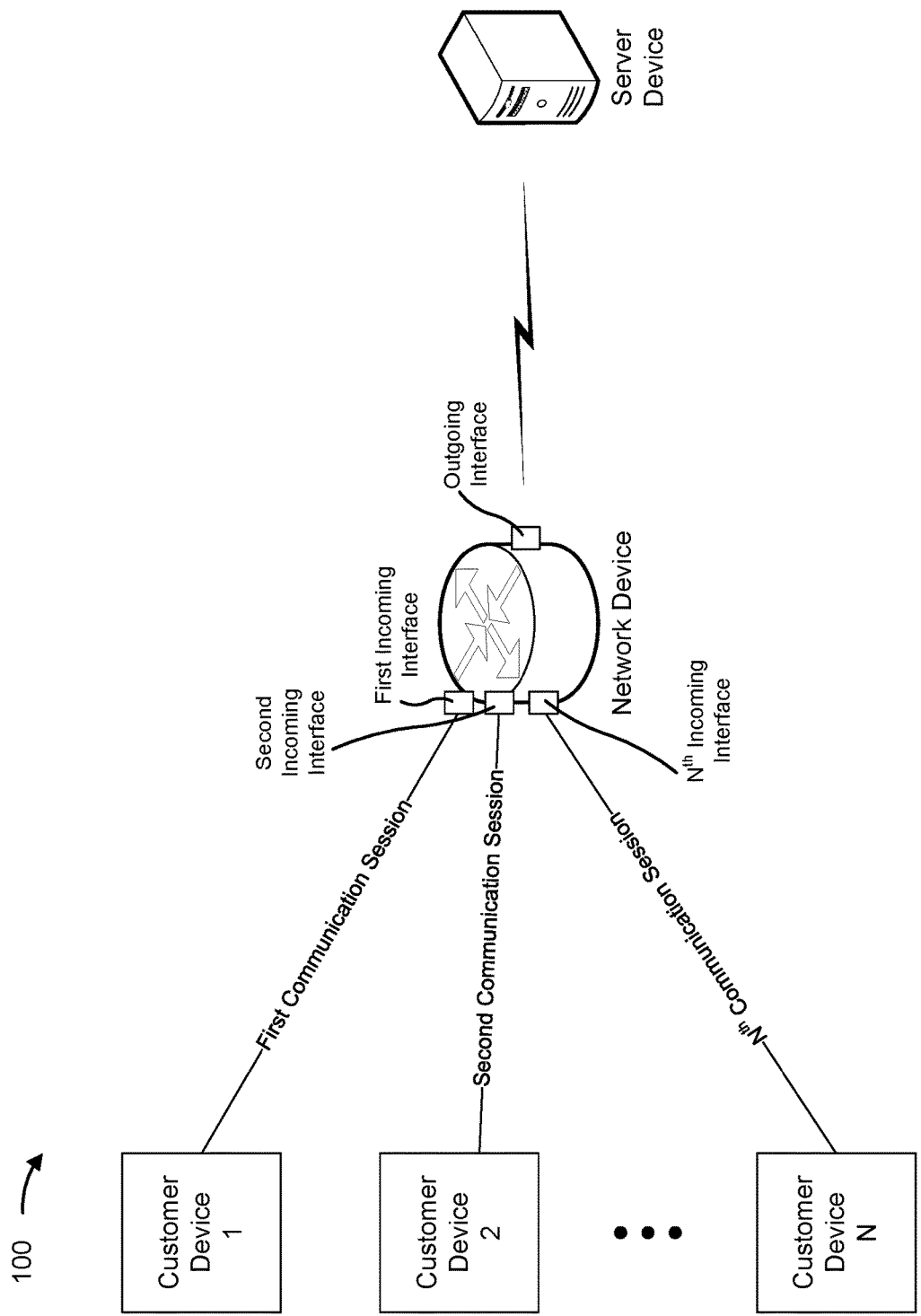
FIGS. 1A-1D are diagrams of one or more example implementations described herein.

The following detailed description of example implementations refers to the accompanying drawings. The same reference numbers in different drawings may identify the same or similar elements.

As described above, a server device may provide services, via a network device, to customer devices that subscribe to the services. Typically, the server device provides a destination address (e.g., a destination IP address) for each service offered by the server device. Accordingly, a customer device is provided (e.g., via a communication protocol, such as via an external border gateway protocol (eBGP)) first destination addresses of the server device that are associated with services to which the customer device is subscribed, and is not provided second destination addresses of the server device that are associated with services to which the customer device is not subscribed. The customer device therefore can send packets, via the network device, to the first destination addresses to obtain, from the server device, the services to which the customer device is subscribed. However, in some cases, the customer device may be configured (e.g., manually configured) to access the second destination addresses of services, and therefore can send packets, via the network device, to the second destination addresses to obtain, from the server device, the services to which the customer device is not subscribed. This can result in unauthorized use of services by the customer device, and can therefore result in wastage of computing resources (e.g., processing resources, memory resources, communication resources, and/or power resources, among other examples) by the server device, the network device, and the customer device to provide the unauthorized services to the customer device. Further, in some cases, the customer device is able to access the services to which the customer device is not subscribed by paying for only the services to which the customer device is subscribed, which results in a monetary loss to the organization associated with the services provided by server device.

In some cases, a firewall, or other filter, of the network device can be configured to control traffic to and from each destination address associated with the server device. However, such configuration is typically a manual process that is cumbersome, time-consuming, and prone to error and delay, especially when there are numerous customer devices with different service subscription profiles. This is simply not practical to do at scale (e.g., when there are hundreds, thousands, or more customer devices). Further, the firewall, or other filter, needs to be manually updated every time there is a change to a service subscription profile of a customer device, increasing a likelihood of even more error and delay.

Some implementations described herein provide a network device that provides traffic filtering based on a destination address of the traffic and an incoming interface of the network device on which the traffic is received (e.g., from a customer device). The network device includes a data structure (e.g., a database, a table, or another structure), wherein each entry indicates a destination address of a server device that is associated with a service provided by the server device, and at least one of a set of one or more authorized incoming interfaces of the network device (e.g., that are respectively associated with a set of one or more customer devices that subscribe to the service) or a set of one or more authorized identifiers that are associated with the destination address (e.g., that are respectively associated with one or more sets of customer devices that subscribe to the service). In some implementations, the data structure is a forwarding information base (FIB) of the network device and each entry may include an indication whether the network device is to forward packets associated with the destination address, and the incoming interface or the identifier associated with the incoming interface.

The network device receives, from a customer device and via an incoming interface of the network device, one or more packets that are destined for a destination address of the server device (e.g., that is associated with a service provided by the server device). The network device determines, based on the destination address and the incoming interface, whether the network device is to forward the one or more packets. For example, the network device determines, based on the destination address, an entry in the data structure that indicates a set of one or more authorized incoming interfaces of the network device that are associated with the destination address or one or more authorized identifiers that are associated with the destination address. The network device determines whether the incoming interface is included in the set of one or more authorized incoming interfaces (e.g., whether the incoming interface is an authorized incoming interface) or whether the incoming interface is associated with the set of one or more authorized identifiers (e.g., whether an identifier associated with the incoming interface is an authorized identifier).

In some implementations, the network device determines to forward the one or more packets, such as when the network device determines that the incoming interface is an authorized incoming interface or when the network device determines that the identifier associated with the incoming interface is an authorized identifier. Accordingly, the network device forwards the one or more packets (e.g., to the destination address of the server device), thereby facilitating authorized access to the service by the customer device. Alternatively, the network device may determine to not forward the one or more packets, such as when the network device determines that the incoming interface is not an authorized incoming interface or when the network device determines that the identifier associated with the incoming interface is not an authorized identifier. Accordingly, the network device refrains from forwarding the one or more packets (e.g., drops the one or more packets), thereby reducing a likelihood of unauthorized access to the service by the customer device.

In this way, the network device facilitates authorized access to services provided by a server device and reduces a likelihood of unauthorized access to services provided by the server device. This reduces use of unauthorized services by a customer device, and therefore reduces waste of computing resources (e.g., processing resources, memory resources, communication resources, and/or power resources, among other examples) by the server device, the network device, and the customer device to provide the unauthorized services to the customer device.

Further, in some implementations, the server device provides, to the network device, route information related to destination addresses associated with the services provided by the server device (e.g., via advertisement packets). The network device uses the route information to automatically generate and update entries of the data structure, and therefore manually configuring a firewall, or other filter, is not needed. Accordingly, error and delay associated with configuring and updating the data structure is minimized, as compared to using a manually configurable firewall. Further, because each entry of the data structure is associated with a destination address (e.g., of a service of the server device), the number of entries in the data structure is equal to the number of services provided by the server device. Accordingly, the number of entries that the network device needs to maintain is less than the number of entries that the network device would otherwise need to maintain in a firewall or other filter. The network device therefore uses less computing resources (e.g., processing resources, memory resources, communication resources, and/or power resources, among other examples) to maintain the data structure than would otherwise be used to maintain the firewall or other filter.

FIGS. 1A-1D are diagrams of one or more example implementations 100 described herein. As shown in FIGS. 1A-1D, example implementation(s) 100 may include one or more customer devices (shown as customer devices 1 through N, where N≥1), a network device, and/or a server device. The one or more customer devices, the network device, and the server device are described in more detail below in connection with FIGS. 2-4.

In some implementations, the network device may be connected (e.g., via a communication link) to each customer device of the one or more customer devices. For example, as shown in FIG. 1A, the network device may include one or more incoming interfaces (shown as the first through $N^{th}$ incoming interfaces) and may be respectively connected to the one or more customer devices via the one or more incoming interfaces. In some implementations, one or more communication sessions may be respectively established between the one or more customer devices and the network device (e.g., via the one or more incoming interfaces of the network device). For example, as shown in FIG. 1A, a first communication session may be established between the customer device 1 and the network device (e.g., via the first incoming interface), a second communication session may be established between the customer device 2 and the network device (e.g., via the second incoming interface), and so on. A communication session, of the one or more communication sessions, may be established according to a communication protocol, such as eBGP, an internal border gateway protocol (iBGP), or another protocol. In some implementations, the network device may be connected to the server device (e.g., via a communication link). For example, as shown in FIG. 1A, the network device may include an outgoing interface and may be connected to the server device via the outgoing interface. In some implementations, a communication session may be established between the network device and the server device, such as according to a communication protocol (e.g., eBGP, iBGP, or another protocol).

The server device may provide one or more services, such as one or more cloud application services. Each service may be associated with a destination address, such as a destination Internet protocol (IP) address, that is associated with the server device. Accordingly, as further described herein, a customer device may send, via the network device, one or more packets to a destination address associated with the server device to request the server device to provide a service associated with the destination address to the customer device.

Figure 1B:
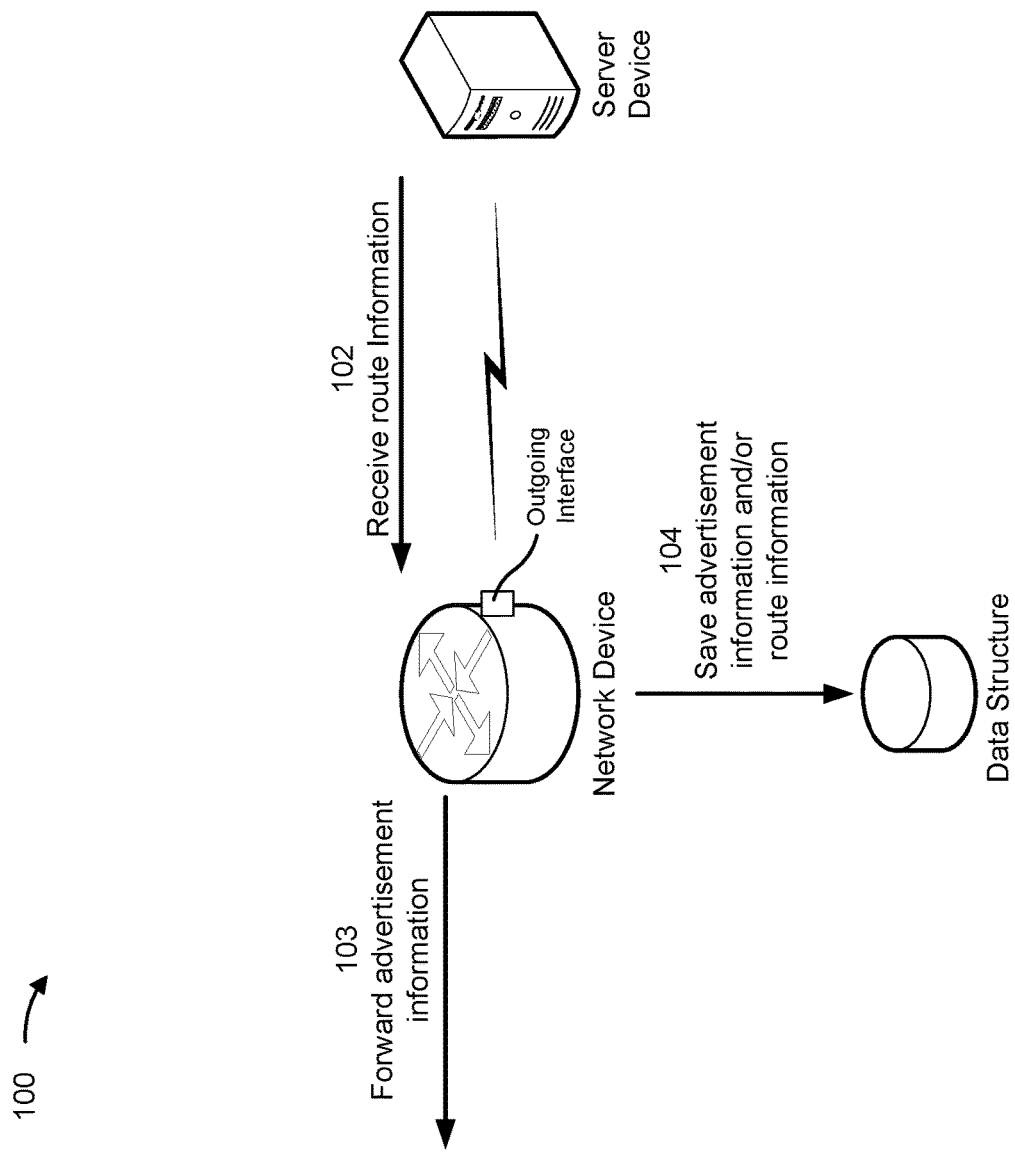

As shown in FIG. 1B, and by reference number 102, the network device may receive route information from the server device, such as via the outgoing interface of the network device. For example, the server device may send one or more advertisement packets (e.g., according to the communication protocol for the communication session established between the server device and the network device) that includes the route information. The route information may include a destination address that is associated with the server device, such as a destination address associated with a service, of the one or more services, provided by the server device. In some implementations, the route information may indicate a set of one or more authorized incoming interfaces of the network device, of the one or more incoming interfaces of the network device, that are associated with the destination address. For example, the set of one or more authorized incoming interfaces of the network device may be respectively associated with a set of one or more customer devices, of the one or more customer devices, that subscribe to the service of the server device that is associated with the destination address. Additionally, or alternatively, the route information may indicate a set of one or more authorized identifiers that are associated with the destination address. An authorized identifier, of the set of one or more authorized identifiers, may be associated with a set of one or more customer devices, of the one or more customer devices, and may indicate that each customer device, of the set of one or more customer devices, subscribes to the service of the server device that is associated with the destination address. For example, each authorized identifier, of the set of one or more authorized identifiers, may be an eBGP group identifier, or a similar identifier.

As shown by reference number 103, the network device may forward advertisement information (also referred to as "advertising" the advertisement information), such as to the set of one or more customer devices that subscribe to the service of the server device that is associated with the destination address. The advertisement information may indicate the destination address, a prefix for the destination address, and/or similar information. In some implementations, the network device may advertise the advertisement information to neighbor devices (e.g., the one or more customer devices, other server devices, or other devices) respectively connected to the network device by one or more interfaces (e.g., some or all of the one or more incoming interfaces and/or one or more outgoing interfaces) of the network device. In some implementations, the network device may forward the route information. For example, the network device may respectively forward the route information via the set of one or more authorized incoming interfaces of the network device. In a particular example, the network device may respectively send one or more advertisement packets that include the route information to the one or more customer devices, such as via the one or more incoming interfaces of the network device (e.g., according to the communication protocols for the respective communication sessions established between the one or more customer devices and the network device via the one or more incoming interfaces). In this way, the set of one or more customer devices may receive the advertisement information and/or the route information to be able to determine the destination address and/or the prefix for the destination address with the server device and thereby be able to send one or more packets to request the service provided by the server device, as described herein.

Additionally, or alternatively, as shown by reference number 104, the network device may save advertisement information and/or the route information. For example, the network device may save the advertisement information and/or the route information in an entry of a data structure. The data structure may be, for example, a table, a database, a file, or another data structure that is included in the network device and/or accessible by the network device. In some implementations, the network device may save the route information based on forwarding the advertisement information and/or the route information (e.g., to indicate that the network device has forwarded the advertisement information and/or the route information to the one or more customer devices).

In an example, the network device may save the advertisement information (e.g., the prefix of the destination address) and the set of one or more interfaces connecting to the neighbors (e.g., upon which the network device advertised the advertisement information) as authorized incoming interfaces of the network device in the entry of the data structure. As another example, the network device may save the advertisement information (e.g., the prefix of the destination address) and a set of one or more authorized identifiers that are associated with the prefix of the destination address in the entry of the data structure (e.g., wherein each identifier is associated with one or more interfaces connecting to the neighbor devices). In an additional example, the network device may save for each of the interfaces connecting to the neighbor devices, the advertisement information (e.g., the prefix of the destination address and the interface or an identifier associated with the interface, as the key of an entry of the FIB.

In some implementations, the data structure may be a FIB of the network device. Accordingly, the entry of the data structure may indicate the destination address, at least one of the set of one or more authorized incoming interfaces of the network device or the set of one or more authorized identifiers that are associated with the destination address, and/or whether the network device is to perform a forwarding action. For example, the entry may indicate that the network device is to forward one or more packets (e.g., that are received by the network device, as described herein) that are associated with the destination address and that are associated with at least one of the set of one or more authorized incoming interfaces of the network device or the set of one or more authorized identifiers that are associated with the destination address.

Alternatively, the data structure may not be the FIB (e.g., the data structure may be different than the FIB). Accordingly, the entry of the data structure may indicate the destination address, and at least one of the set of one or more authorized incoming interfaces of the network device or the set of one or more authorized identifiers that are associated with the destination address. That is, the entry may indicate that the destination address is associated with the set of one or more authorized incoming interfaces (e.g., packets destined for the destination address and received via the one or more authorized incoming interfaces are to be forwarded to the destination address) and/or is associated with the set of one or more authorized identifiers (e.g., packets destined for the destination address and received via incoming interfaces associated with the set of one or more authorized identifiers are to be forwarded to the destination address).

Figure 1C:
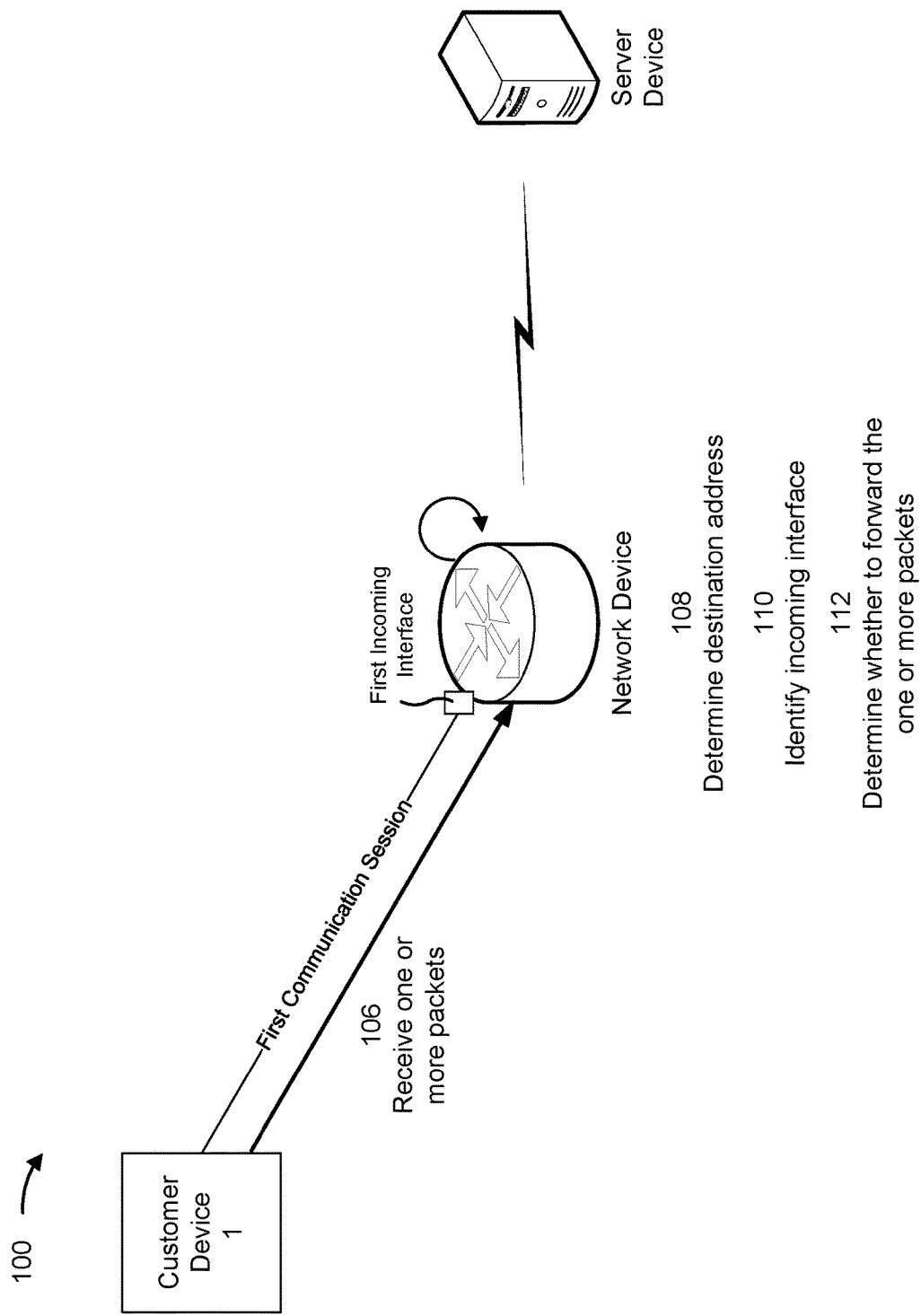

As shown in FIG. 1C, and by reference number 106, the network device may receive one or more packets (e.g., via an incoming interface, of the one or more incoming interfaces, of the network device). For example, as shown in FIG. 1C, the customer device 1 may send one or more packets to the network device via the first incoming interface of the network device (e.g., via the first communication session established between the customer device 1 and the network device). The one or more packets may be associated with a destination address (e.g., the one or more packets may include information that indicates the destination address). The destination address may be associated with the server device, such as a destination address associated with a service, of the one or more services, provided by the server device. Accordingly, the customer device 1 may send the one or more packets to request the service provided by the server device.

As shown by reference number 108, the network device may determine the destination address associated with the one or more packets. For example, the network device may process (e.g., parse and/or read) the one or more packets to determine the destination address. As shown by reference number 110, the network device may identify the incoming interface on which the network device received the one or more packets. For example, the network device may identify the first incoming interface as the incoming interface, of the one or more incoming interfaces of the network device, on which the network device received the one or more packets sent by the customer device 1. In some implementations, the incoming interface may be associated with an identifier (e.g., an eBGP group identifier), and, the network device may therefore determine the identifier (e.g., based on configuration information of the network device that indicates the association between the incoming interface and the identifier). The identifier may indicate that the incoming interface is associated with a set of one or more customer devices, of the one or more customer devices, that subscribe to a set of one or more services of the one or more services provided by the server device.

As shown by reference number 112, the network device may determine whether to forward the one or more packets (e.g., determine to forward the one or more packets, or to refrain from forwarding the one or more packets). For example, the network device may determine whether to forward the one or more packets based on the destination address associated with the one or more packets, the incoming interface of the network device (e.g., on which the network device received the one or more packets), and/or the identifier associated with the incoming interface.

In an example, such as when the data structure is the FIB of the network device, the network device may identify (e.g., based on the destination address, and the incoming interface or the identifier associated with the incoming interface) an entry in the data structure. The network device may search, for example, based on the destination address, and the incoming interface or the identifier associated with the incoming interface, the data structure (e.g., the FIB) to identify the entry. The entry may indicate whether the network device is to forward the one or more packets. That is, the entry may indicate that packets associated with the destination address, and the incoming interface or the identifier associated with the incoming interface, are to be forwarded by the network device or to not be forwarded by the network device. Accordingly, the network device may determine, based on the entry, whether the network device is to forward the one or more packets. For example, the network device may determine that the network device is to forward the one or more packets when the entry indicates that the network device is to forward the or more packets. As an alternative example, the network device may determine that the network device is to refrain from forwarding the one or more packets when the entry indicates that the network device is to not forward the one or more packet.

In another example, such as when the data structure is not the FIB of the network device, the network device may identify (e.g., based on the destination address) an entry in the data structure. The network device may search, for example, based on the destination address, the data structure to identify the entry. The entry may indicate a set of one or more authorized incoming interfaces of the network device that are associated with the destination address (e.g., a set of one or more authorized incoming interfaces of the network device that are respectively associated with a set of one or more customer devices, of the one or more customer devices, that subscribe to the service of the server device that is associated with the destination address). Accordingly, the network device may determine whether the incoming interface is included in the set of one or more authorized incoming interfaces (e.g., whether the incoming interface is an authorized incoming interface). The network device may determine, based on determining whether the incoming interface of network device is included in the set of one or more authorized incoming interfaces, whether the network device is to forward the one or more packets. For example, the network device may determine that the network device is to forward the one or more packets based on determining that the incoming interface of the network device is included in the set of one or more authorized incoming interfaces of the network device. As an alternative example, the network device may determine that the network device is to refrain from forwarding the one or more packets based on determining that the incoming interface of the network device is not included in the set of one or more authorized incoming interfaces of the network device.

In an additional example, such as when the data structure is not the FIB of the network device, the network device may identify (e.g., based on the destination address) an entry in the data structure. The network device may search, for example, based on the destination address, the data structure to identify the entry. The entry may indicate a set of one or more authorized identifiers that are associated with the destination address (e.g., a set of one or more authorized identifiers that are respectively associated with one or more sets of customer devices, of the one or more customer devices, that subscribe to the service of the server device that is associated with the destination address). Accordingly, the network device may determine whether the incoming interface is associated with the set of one or more authorized identifiers. For example, the network device may identify an identifier that is associated with the incoming interface (e.g., based on configuration information of the network device) and determine whether the identifier is included in the set of one or more authorized identifiers (e.g., whether the identifier is an authorized identifier). The network device may determine, based on determining whether the incoming interface of the network device is associated with the set of one or more authorized identifiers, whether the network device is to forward the one or more packets. For example, the network device may determine that the network device is to forward the one or more packets based on determining that the incoming interface of the network device is associated with the set of one or more authorized identifiers. As an alternative example, the network device may determine that the network device is to refrain from forwarding the one or more packets based on determining that the incoming interface of the network device is not associated with the set of one or more authorized identifiers.

Figure 1D:
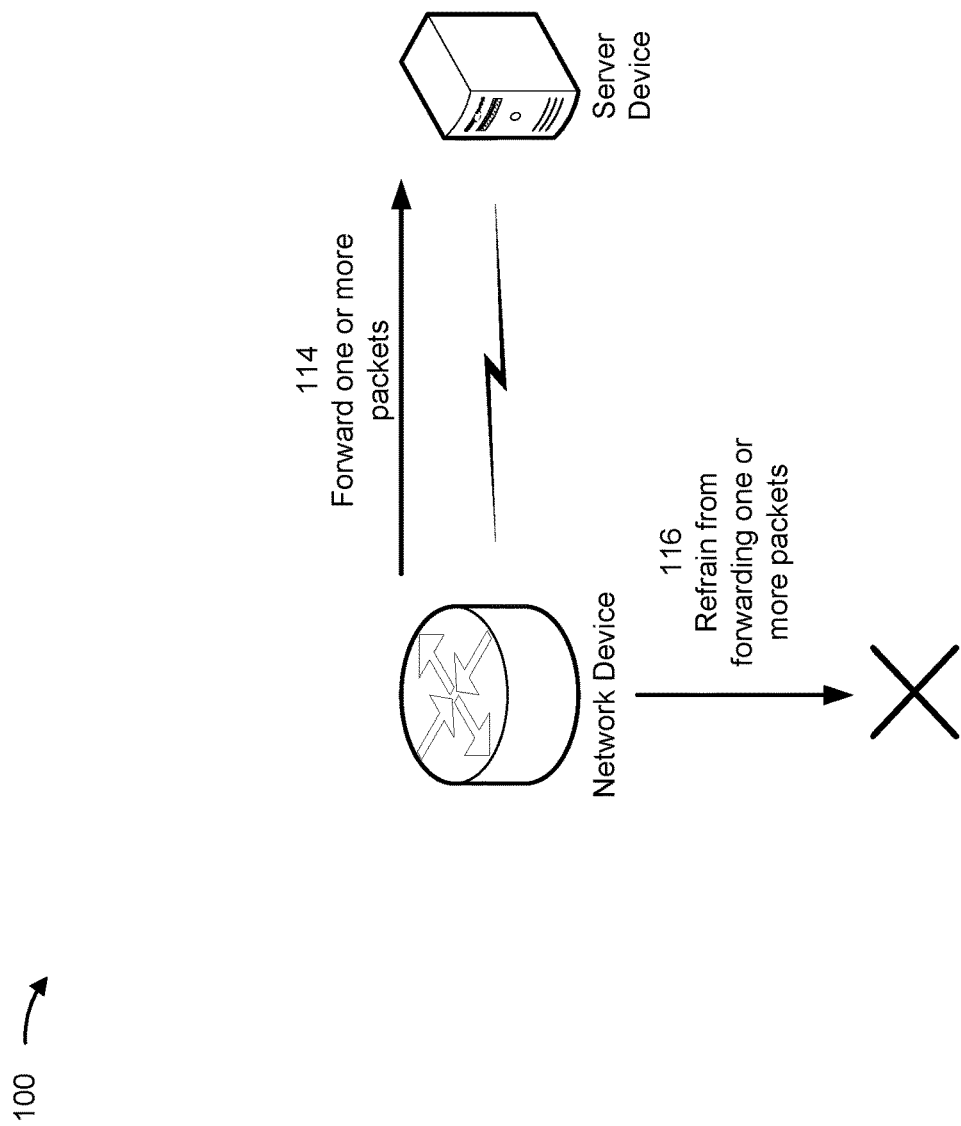

As shown in FIG. 1D, and by reference numbers 114 and 116, the network device may selectively forward the one or more packets. For example, as shown by reference number 114, the network device may forward the one or more packets (e.g., to the server device, via the outgoing interface of the network device) based on determining that the network device is to forward the one or more packets. Alternatively, as shown by reference number 116, the network device may refrain from forwarding the one or more packets. For example, the network device may refrain from forwarding the one or more packets (e.g., may drop the one or more packets) based on determining that the network device is to refrain from forwarding the one or more packets.

As indicated above, FIGS. 1A-1D are provided merely as one or more examples. Other examples may differ from what is described with regard to FIGS. 1A-1D. The number and arrangement of devices shown in FIGS. 1A-1D are provided as one or more examples. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2:
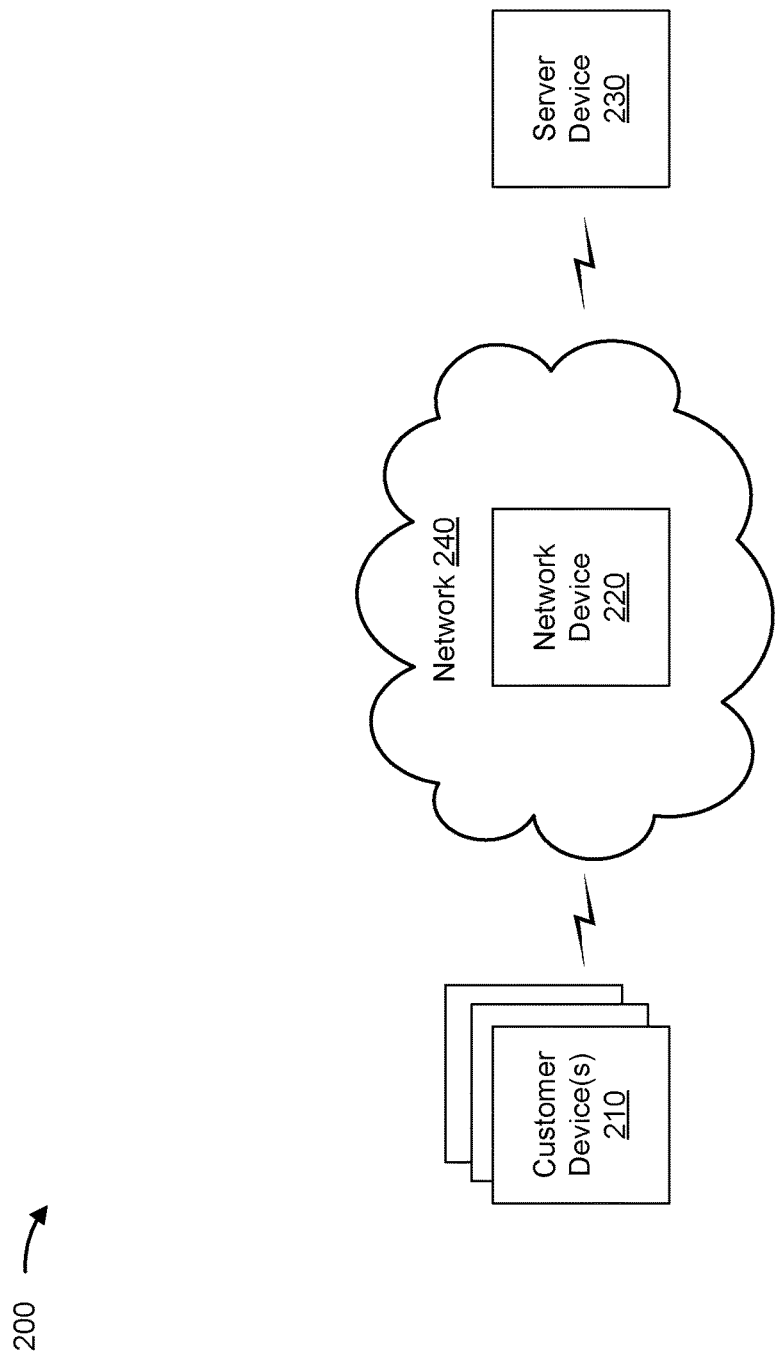
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more customer devices 210, a network device 220, a server device 230, and a network 240. Devices of the environment 200 may interconnect via wired connections, wireless connections, or a combination of wired and wireless connections.

The customer device 210 includes one or more devices capable of receiving, generating, storing, processing, and/or providing information, such as information described herein. For example, the customer device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the customer device 210 may send one or more packets to the network device 220 to attempt to access one or more services provided by the server device 230, as described herein.

The network device 220 includes one or more devices capable of receiving, processing, storing, routing, and/or providing information, such as information described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, the network device 220 may include one or more interfaces, and may receive and forward, or refrain from forwarding, one or more packets, as described herein.

The server device 230 may include one or more devices capable of receiving, generating, storing, processing, providing, and/or information, such as information described herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment. In some implementations, the server device may be configured to provide one or more services to the customer device 210 via the network device 220, as described herein.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
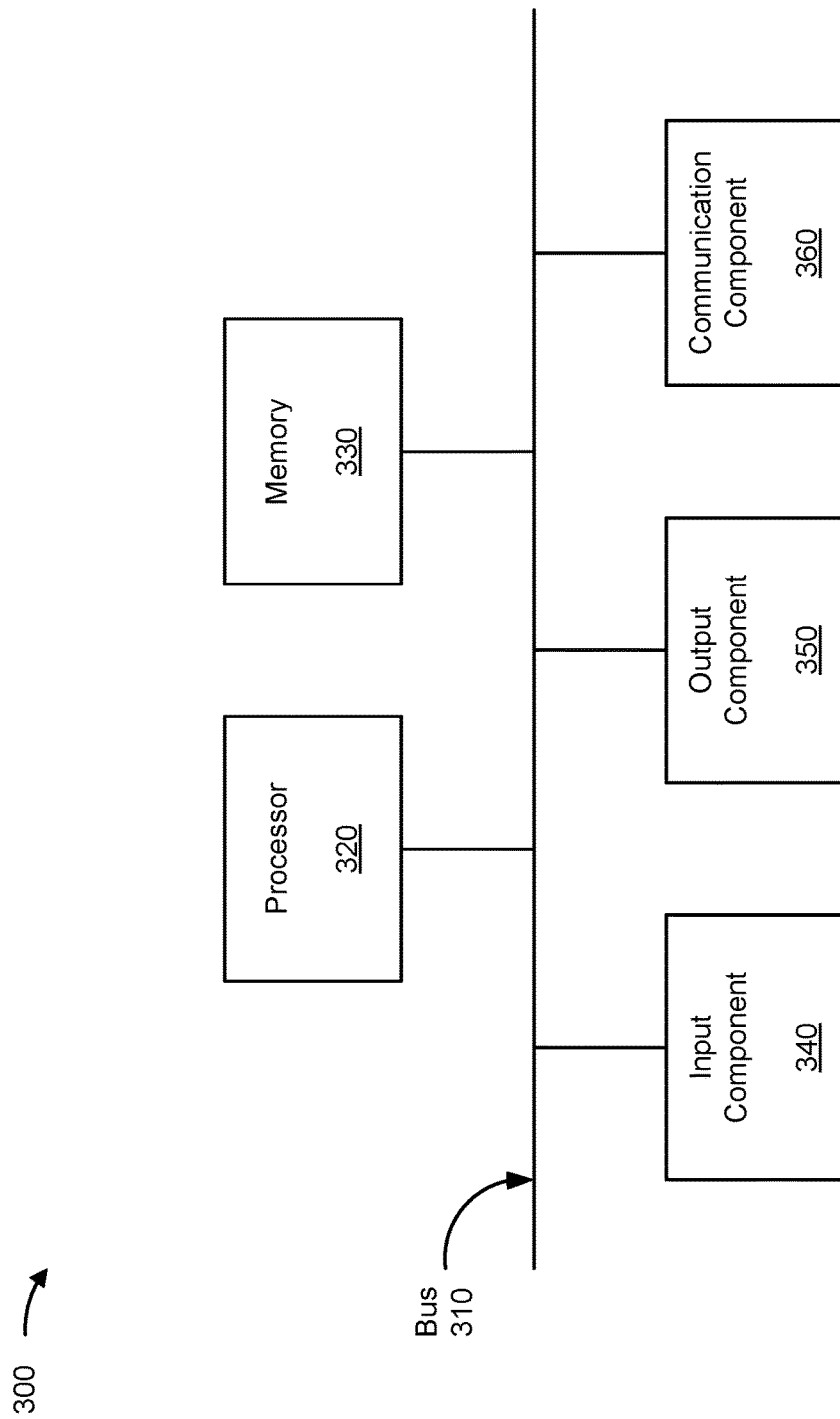
FIG. 3 is a diagram of example components of a device associated with traffic filtering based on a destination address and an incoming interface of a network device.

FIG. 3 is a diagram of example components of a device 300 associated with traffic filtering based on a destination address and an incoming interface of a network device. Device 300 may correspond to the customer device 210, the network device 220, and/or the server device 230. In some implementations, the customer device 210, the network device 220, and/or the server device 230 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
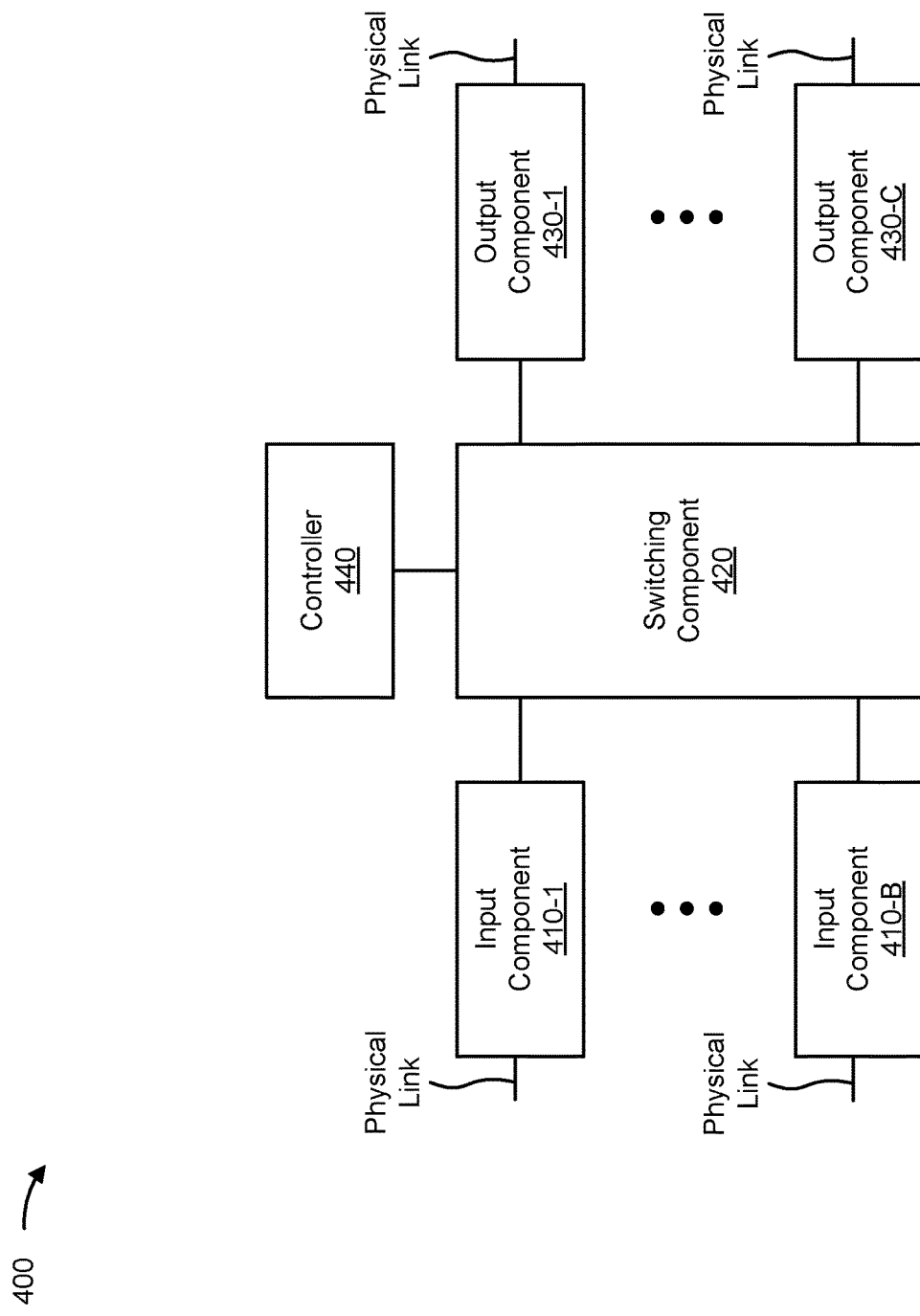
FIG. 4 is a diagram of example components of a device associated with traffic filtering based on a destination address and an incoming interface of a network device.

FIG. 4 is a diagram of example components of a device 400 associated with traffic filtering based on a destination address and an incoming interface of a network device. Device 400 may correspond to the customer device 210, the network device 220, and/or the server device 230. In some implementations, the customer device 210, the network device 220, and/or the server device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
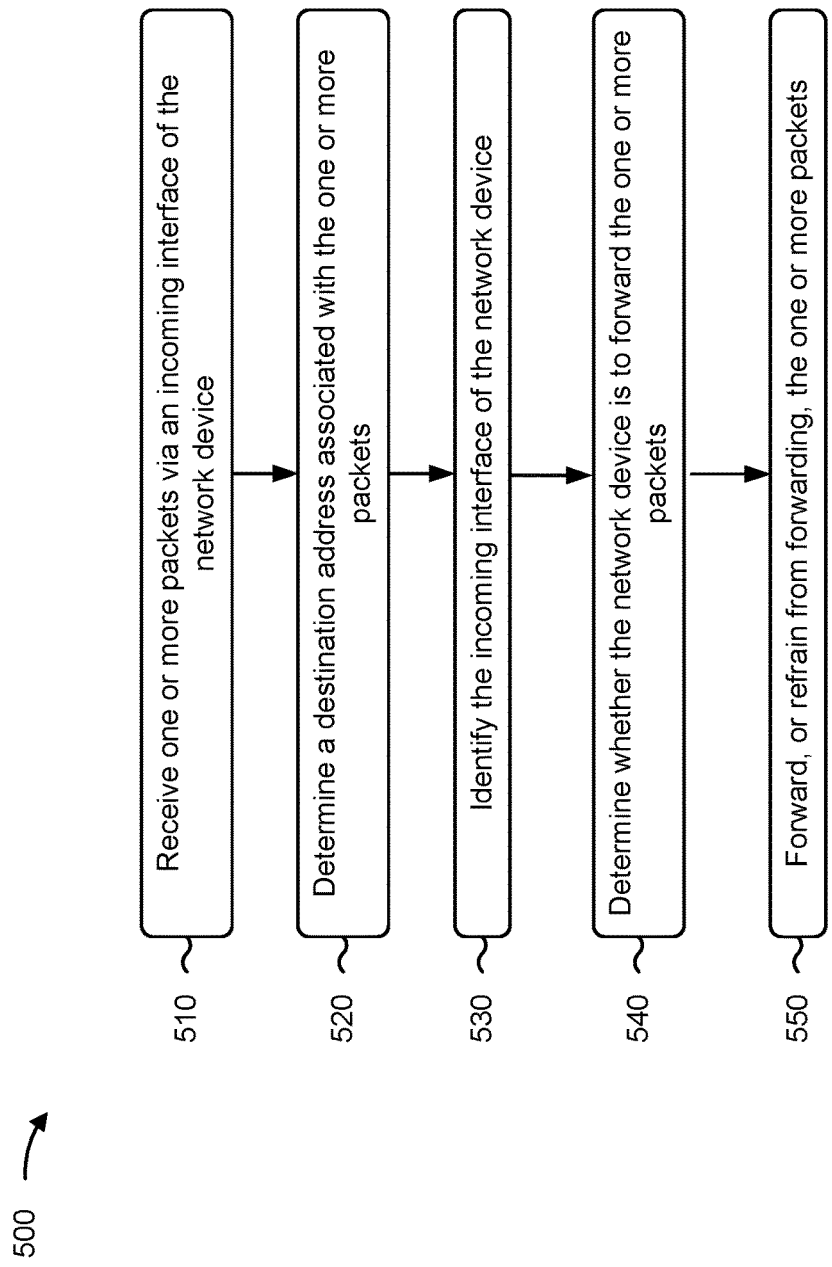
FIG. 5 is a flowchart of an example process associated with traffic filtering based on a destination address and an incoming interface of a network device.

FIG. 5 is a flowchart of an example process 500 associated with traffic filtering based on a destination address and an incoming interface of a network device. In some implementations, one or more process blocks of FIG. 5 are performed by a network device (e.g., the network device 220). In some implementations, one or more process blocks of FIG. 5 are performed by another device or a group of devices separate from or including the device, such as a customer device (e.g., the customer device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving one or more packets via an incoming interface of the network device (block 510). For example, the network device may receive one or more packets via an incoming interface of the network device, as described above.

As further shown in FIG. 5, process 500 may include determining a destination address associated with the one or more packets (block 520). For example, the network device may determine a destination address associated with the one or more packets, as described above.

As further shown in FIG. 5, process 500 may include identifying the incoming interface of the network device (block 530). For example, the network device may identify the incoming interface of the network device, as described above.

As further shown in FIG. 5, process 500 may include determining whether the network device is to forward the one or more packets (block 540). For example, the network device may determine, based on the destination address and the incoming interface of the network device, whether the network device is to forward the one or more packets, as described above.

As further shown in FIG. 5, process 500 may include forwarding, or refrain from forwarding, the one or more packets (block 550). For example, the network device may forward, or refrain from forwarding, based on determining whether the network device is to forward the one or more packets, the one or more packets, as described above.

Process 500 may include additional implementations, such as any single implementation or any combination of implementations described below and/or in connection with one or more other processes described elsewhere herein.

In a first implementation, determining whether the network device is to forward the one or more packets includes searching, based on the destination address, a data structure to identify an entry that indicates a set of one or more authorized incoming interfaces of the network device that are associated with the destination address; determining whether the incoming interface of the network device is included in the set of one or more authorized incoming interfaces; and determining, based on determining whether the incoming interface of the network device is included in the set of one or more authorized incoming interfaces, whether the network device is to forward the one or more packets, wherein the network device determines that the network device is to forward the one or more packets based on determining that the incoming interface of the network device is included in the set of one or more authorized incoming interfaces of the network device, and wherein the network device determines that the network device is to refrain from forwarding the one or more packets based on determining that the incoming interface of the network device is not included in the set of one or more authorized incoming interfaces of the network device.

In a second implementation, alone or in combination with the first implementation, process 500 includes receiving, prior to receiving the one or more packets, route information indicating the destination address and the set of one or more authorized incoming interfaces of the network device that are associated with the destination address, and saving the route information in the entry of the data structure.

In a third implementation, alone or in combination with one or more of the first and second implementations, determining whether the network device is to forward the one or more packets includes searching, based on the destination address, a data structure to identify an entry that indicates a set of one or more authorized identifiers that are associated with the destination address; determining whether the incoming interface of the network device is associated with the set of one or more authorized identifiers; and determining, based on determining whether the incoming interface of the network device is associated with the set of one or more authorized identifiers, whether the network device is to forward the one or more packets, wherein the network device determines that the network device is to forward the one or more packets based on determining that the incoming interface of the network device is associated with the set of one or more authorized identifiers, and wherein the network device determines that the network device is to refrain from forwarding the one or more packets based on determining that the incoming interface of the network device is not associated with the set of one or more authorized identifiers.

In a fourth implementation, alone or in combination with one or more of the first through third implementations, process 500 includes receiving, prior to receiving the one or more packets, route information indicating the destination address and the set of one or more authorized identifiers that are associated with the destination address, and saving the route information in the entry of the data structure.

In a fifth implementation, alone or in combination with one or more of the first through fourth implementations, each authorized identifier, of the set of one or more authorized identifiers is an eBGP group identifier.

In a sixth implementation, alone or in combination with one or more of the first through fifth implementations, determining whether the network device is to forward the one or more packets includes searching, based on the destination address and the incoming interface, a forwarding information base (FIB) to identify an entry that indicates whether the network device is to forward the one or more packets; and determining, based on the entry, whether the network device is to forward the one or more packets, wherein the network device determines that the network device is to forward the one or more packets when the entry indicates that the network device is to forward the one or more packets, and wherein the network device determines that the network device is to refrain from forwarding the one or more packets when the entry indicates that the network device is to not forward the one or more packets.

In a seventh implementation, alone or in combination with one or more of the first through sixth implementations, process 500 includes receiving, prior to receiving the one or more packets, route information indicating the destination address, and at least one of a set of one or more authorized incoming interfaces of the network device or a set of one or more authorized identifiers that are associated with the destination address, and saving the route information in the entry of the FIB.

In eighth implementation, alone or in combination with one or more of the first through seventh implementations, determining whether the network device is to forward the one or more packets includes identifying, based on the destination address, an entry in a data structure that indicates a set of one or more authorized incoming interfaces of the network device that are associated with the destination address; and determining, based on the entry and the incoming interface of the network device, whether the network device is to forward the one or more packets, wherein the network device determines that the network device is to forward the one or more packets when the incoming interface of the network device is included in the set of one or more authorized incoming interfaces indicated by the entry, and wherein the network device determines that the network device is to refrain from forwarding the one or more packets when the incoming interface of the network device is not included in the set of one or more authorized incoming interfaces indicated by the entry.

In a ninth implementation, alone or in combination with one or more of the first through eighth implementations, determining whether the network device is to forward the one or more packets includes identifying, based on the destination address, an entry in a data structure that indicates a set of one or more authorized identifiers that are associated with the destination address; and determining, based on the entry and the incoming interface of the network device, whether the network device is to forward the one or more packets, wherein the network device determines that the network device is to forward the one or more packets when the incoming interface of the network device is associated with the set of one or more authorized identifiers, and wherein the network device determines that the network device is to refrain from forwarding the one or more packets when the incoming interface of the network device is not associated with the set of one or more authorized identifiers.

In a tenth implementation, alone or in combination with one or more of the first through ninth implementations, determining whether the network device is to forward the one or more packets includes identifying, based on the destination address and the incoming interface, an entry in a data structure that indicates whether the network device is to forward the one or more packets; and determining, based on the entry, whether the network device is to forward the one or more packets, wherein the network device determines that the network device is to forward the one or more packets when the entry indicates that the network device is to forward the one or more packets, and wherein the network device determines that the network device is to refrain from forwarding the one or more packets when the entry indicates that the network device is to not forward the one or more packets.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a network device, one or more packets via an incoming interface of the network device;
  determining, by the network device, a destination address associated with one or more services and the one or more packets;
  identifying, by the network device, the incoming interface of the network device;
  searching, based on the destination address, a data structure to identify an entry that indicates a set of one or more authorized identifiers that are associated with the destination address,
    wherein each authorized identifier, of the set of one or more authorized identifiers, is associated with a subscription related to the one or more services;
  determining, by the network device, whether the destination address and the incoming interface of the network device are associated with the set of one or more authorized identifiers;
  determining, by the network device and based on determining whether the destination address and the incoming interface of the network device are associated with the set of one or more authorized identifiers, whether the network device is to forward the one or more packets; and
  forwarding, by the network device, or refraining from forwarding, based on determining whether the network device is to forward the one or more packets, the one or more packets.

2. The method of claim 1, wherein determining whether the network device is to forward the one or more packets comprises:
  searching, based on the destination address, the data structure to identify another entry that indicates a set of one or more authorized incoming interfaces of the network device that are associated with the destination address;
  determining whether the incoming interface of the network device is included in the set of one or more authorized incoming interfaces; and
  determining, based on determining whether the incoming interface of the network device is included in the set of one or more authorized incoming interfaces, whether the network device is to forward the one or more packets,
    wherein the network device determines that the network device is to forward the one or more packets based on determining that the incoming interface of the network device is included in the set of one or more authorized incoming interfaces of the network device, and
    wherein the network device determines that the network device is to refrain from forwarding the one or more packets based on determining that the incoming interface of the network device is not included in the set of one or more authorized incoming interfaces of the network device.

3. The method of claim 1, further comprising:
  advertising, prior to receiving the one or more packets, a prefix for the destination address to neighbor devices respectively connected to the network device by one or more interfaces of the network device; and
  saving, based on advertising the prefix for the destination address, the prefix for the destination address and information associated with a set of the one or more interfaces of the network device connecting to the neighbor devices as authorized incoming interfaces of the network device in another entry of the data structure.

4. The method of claim 1, wherein
  the network device determines that the network device is to forward the one or more packets based on determining that the incoming interface of the network device is associated with the set of one or more authorized identifiers, and
  wherein the network device determines that the network device is to refrain from forwarding the one or more packets based on determining that the incoming interface of the network device is not associated with the set of one or more authorized identifiers.

5. The method of claim 1, further comprising:
  advertising, prior to receiving the one or more packets, a prefix for the destination address to neighbor devices respectively connected to the network device by one or more interfaces of the network device; and
  saving, based on advertising the prefix for the destination address, the prefix for the destination address and the set of one or more authorized identifiers that are associated with the prefix of the destination address in the entry of the data structure,
    wherein each authorized identifier, of the set of one or more authorized identifiers, is associated with one or more interfaces connecting to the neighbor devices.

6. The method of claim 1, wherein each authorized identifier, of the set of one or more authorized identifiers, is an external border gateway protocol group identifier.

7. The method of claim 1, wherein determining whether the network device is to forward the one or more packets comprises:
  searching, based on the destination address and the incoming interface, a forwarding information base (FIB) to identify another entry that indicates whether the network device is to forward the one or more packets; and
  determining, based on the other entry, whether the network device is to forward the one or more packets,
    wherein the network device determines that the network device is to forward the one or more packets when the entry indicates that the network device is to forward the one or more packets, and
    wherein the network device determines that the network device is to refrain from forwarding the one or more packets when the entry indicates that the network device is to not forward the one or more packets.

8. The method of claim 7, further comprising:
  advertising, prior to receiving the one or more packets, a prefix of the destination address to neighbor devices respectively connected to the network device by one or more interfaces of the network device; and
  saving, based on advertising the prefix of the destination address, for each of the interfaces connecting to the neighbor devices, the prefix and information associated with the interface in association with an entry of the FIB.

9. The method of claim 8, wherein an identifier associated with the interface is an external border gateway protocol group identifier.

10. A non-transitory computer-readable medium storing a set of instructions, the set of instructions comprising:
one or more instructions that, when executed by one or more processors of a network device, cause the network device to:
receive one or more packets via an incoming interface of the network device;
search, based on a destination address associated with one or more services and the one or more packets, a data structure to identify an entry that indicates a set of one or more authorized identifiers that are associated with the destination address,
wherein each authorized identifier of the set of one or more authorized identifiers is associated with a subscription related to the one or more services;
determine, based on determining whether the incoming interface of the network device is associated with the set of one or more authorized identifiers, whether the network device is to forward the one or more packets; and
forward, or refrain from forwarding, based on determining whether the network device is to forward the one or more packets, the one or more packets.

11. The non-transitory computer-readable medium of claim 10, wherein the one or more instructions, that cause the network device to determine whether the network device is to forward the one or more packets, cause the network device to:
identify, based on the destination address, another entry in the data structure that indicates a set of one or more authorized incoming interfaces of the network device that are associated with the destination address; and
determine, based on the other entry and the incoming interface of the network device, whether the network device is to forward the one or more packets,
wherein the network device determines that the network device is to forward the one or more packets when the incoming interface of the network device is included in the set of one or more authorized incoming interfaces indicated by the other entry, and
wherein the network device determines that the network device is to refrain from forwarding the one or more packets when the incoming interface of the network device is not included in the set of one or more authorized incoming interfaces indicated by the other entry.

12. The non-transitory computer-readable medium of claim 10, wherein the one or more instructions, when executed by the one or more processors, further cause the network device to:
advertise, prior to receiving the one or more packets, a prefix for the destination address to neighbor devices respectively connected to the network device by one or more interfaces of the network device; and
save, based on advertising the prefix for the destination address, the prefix for the destination address and information associated with a set of the one or more interfaces of the network device connecting to the neighbor devices as authorized incoming interfaces of the network device in another entry of the data structure.

13. The non-transitory computer-readable medium of claim 10, wherein the one or more instructions, when executed by the one or more processors, further cause the network device to:
advertise, prior to receiving the one or more packets, a prefix for the destination address to neighbor devices respectively connected to the network device by one or more interfaces of the network device; and
save, based on advertising the prefix for the destination address, the prefix for the destination address and the set of one or more authorized identifiers that are associated with the prefix of the destination address in the entry of the data structure,
wherein each authorized identifier, of the set of one or more authorized identifiers, is associated with one or more interfaces connecting to the neighbor devices.

14. The non-transitory computer-readable medium of claim 10, wherein the one or more instructions, that cause the network device to determine whether the network device is to forward the one or more packets, cause the network device to:
identify, based on the destination address and the incoming interface, another entry in the data structure that indicates whether the network device is to forward the one or more packets; and
determine, based on the other entry, whether the network device is to forward the one or more packets,
wherein the network device determines that the network device is to forward the one or more packets when the entry indicates that the network device is to forward the one or more packets, and
wherein the network device determines that the network device is to refrain from forwarding the one or more packets when the entry indicates that the network device is to not forward the one or more packets.

15. The non-transitory computer-readable medium of claim 10, wherein the one or more instructions, when executed by the one or more processors, further cause the network device to:
advertise, prior to receiving the one or more packets, a prefix of the destination address to neighbor devices respectively connected to the network device by one or more interfaces of the network device; and
save, based on advertising the prefix of the destination address, for each of the interfaces connecting to the neighbor devices, the prefix and information associated with the interface or an identifier associated with the interface, in association with an entry of a forwarding information base (FIB).

16. A network device, comprising:
one or more memories; and
one or more processors to:
receive one or more packets via an incoming interface of the network device;
search, based on a destination address associated with one or more services and the one or more packets, a data structure to identify an entry that indicates a set of one or more authorized identifiers that are associated with the destination address,
wherein each authorized identifier of the set of one or more authorized identifiers is associated with a subscription related to the one or more services;
determine, based on determining whether the incoming interface of the network device is associated with the set of authorized identifiers, whether the network device is to forward the one or more packets; and forward, or refrain from forwarding, based on determining whether the network device is to forward the one or more packets, the one or more packets.

17. The network device of claim 16, wherein the one or more processors, to forward, or refrain from forwarding, the one or more packets, are to:

identify, based on the destination address, another entry in the data structure that indicates a set of one or more authorized incoming interfaces of the network device that are associated with the destination address; and forward, or refrain from forwarding, based on the entry and the incoming interface of the network device, the one or more packets.

18. The network device of claim 16, wherein the one or more processors, to forward, or refrain from forwarding, the one or more packets, are to:

identify, based on the destination address and the incoming interface, another entry in the data structure that indicates whether the network device is to forward the one or more packets; and forward, or refrain from forwarding, based on the entry, the one or more packets.

19. The network device of claim 16, wherein the one or more processors, to forward, or refrain from forwarding, the one or more packets, are to:

advertise, prior to receiving the one or more packets, a prefix of the destination address to neighbor devices respectively connected to the network device by one or more interfaces of the network device; and save, based on advertising the prefix of the destination address, for each of the interfaces connecting to the neighbor devices, the prefix and information associated with the interface or an identifier associated with the interface, in association with an entry of a forwarding information base (FIB).

20. The network device of claim 16, wherein the one or more processors are further to:

advertise, prior to receiving the one or more packets, a prefix for the destination address to neighbor devices respectively connected to the network device by one or more interfaces of the network device; and save, based on advertising the prefix for the destination address, the prefix for the destination address and the set of one or more authorized identifiers that are associated with the prefix of the destination address in the entry of the data structure, wherein each authorized identifier, of the set of one or more authorized identifiers, is associated with one or more interfaces connecting to the neighbor devices.

* * * * *